Figure 1:
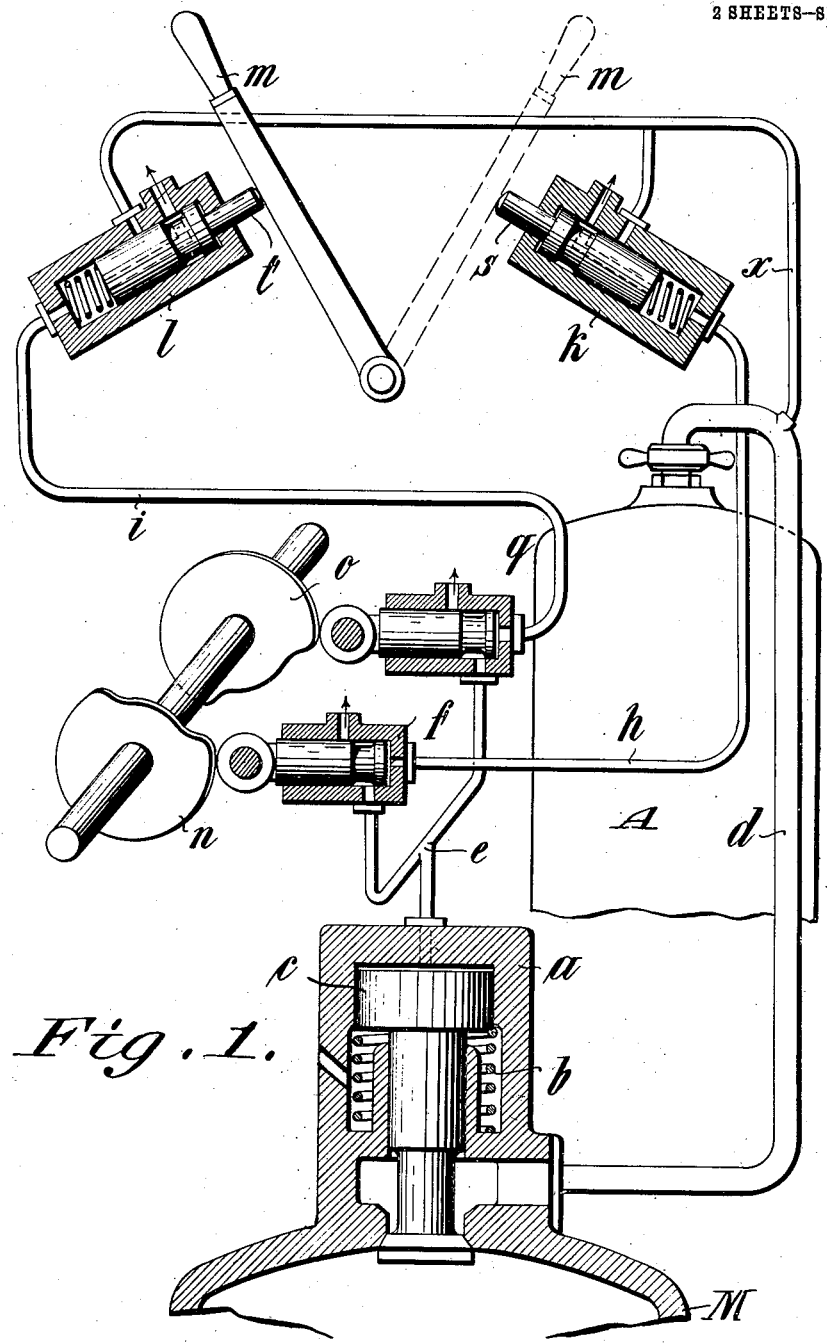

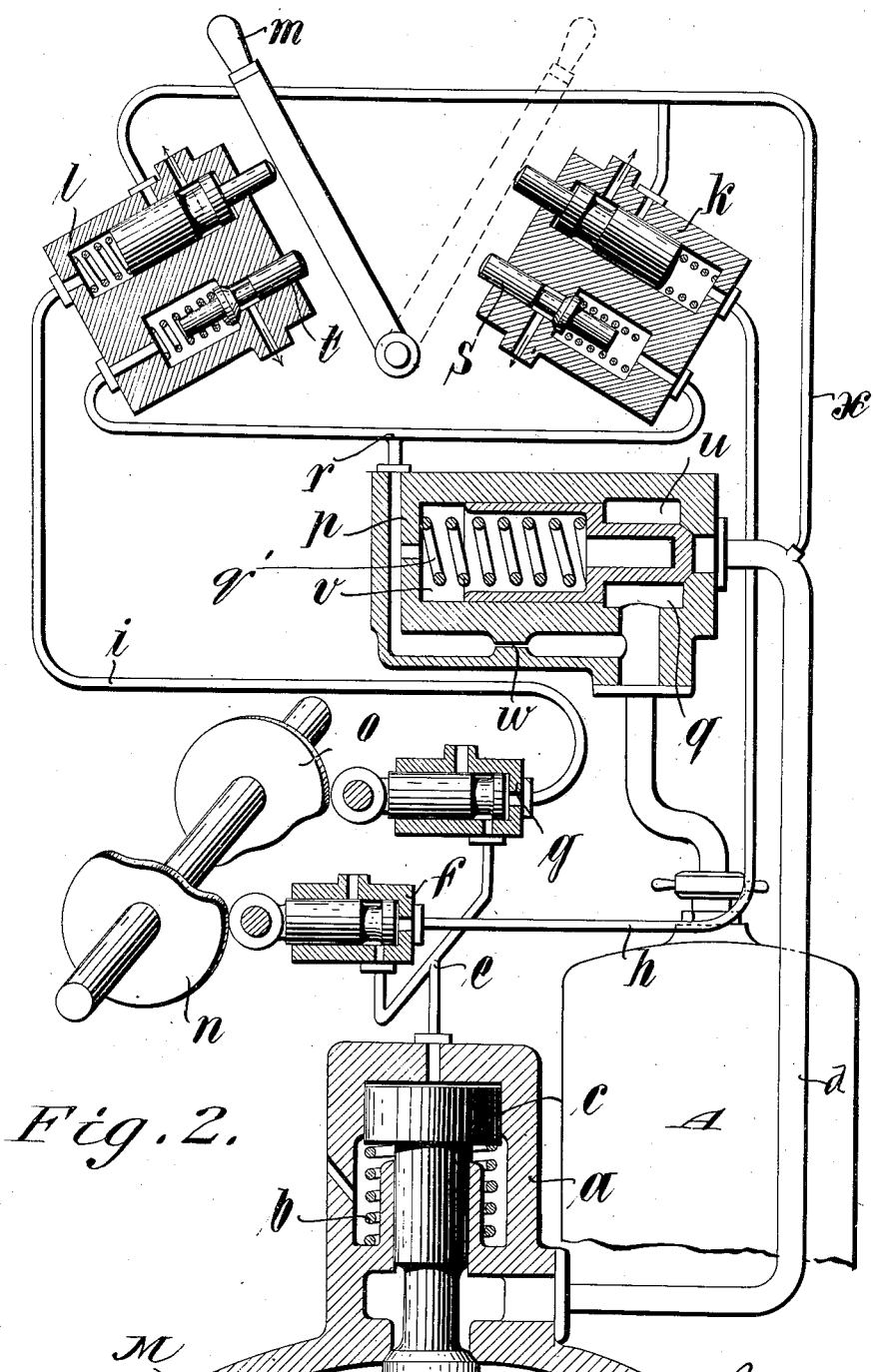

UNITED STATES PATENT OFFICE.

HANS THEODOR BRUNS, OF NUREMBERG, GERMANY.

STARTING AND REVERSING MECHANISM FOR MULTICYLINDER INTERNAL-COMBUSTION ENGINES.

1,005,507.  Specification of Letters Patent.  Patented Oct. 10, 1911.

Application filed December 23, 1909. Serial No. 534,590.

*To all whom it may concern:*

Be it known that I, HANS TH. BRUNS, a subject of the King of Prussia, residing at Nuremberg, in the Kingdom of Bavaria and German Empire, have invented new and useful Improvements in or Relating to Starting and Reversing Mechanism for Multicylinder Internal-Combustion Engines, of which the following is a specification.

This invention relates to improvements in starting and reversing mechanism for multicylinder two cycle internal combustion engines.

Two embodiments of the invention are illustrated in the accompanying drawing by way of example, in which—

Figure 1 is a diagram, showing in section part of the engine cylinder with the starting valve, the distributing valves, the operating members therefor and the compressed air vessel; Fig. 2 is a similar diagram to Fig. 1, showing a modification.

$a$ is the starting valve, the cone of which is held in closed position by a spring $b$. The upper part of the valve cone is formed as a piston $c$. The conduit $d$ from the compressed air vessel A opens laterally into the casing of the starting valve. Above the piston $c$ the starting valve is connected by the conduit $e$ with the two distributing valves $f$ and $g$ which communicate respectively through the conduits $h$ and $i$ with the operating members $k$ and $l$. A conduit $x$ connected with the conduit $d$ runs to the operating members.

The engine is started in the following manner:—In Fig. 1 the compressed air vessel A is opened and either the operating member $k$ or $l$ actuated by the operating lever $m$. The air then flows through the operating member $k$ or $l$ into the conduit $h$ or $i$, places the slide valve $f$ or $g$ in operative position with respect to the cam $n$ or $o$ and then flows through the conduit $e$ into the casing of the starting valve $a$, exerting a pressure on the piston $c$. The starting valve is opened and air can now flow through the conduit $d$ into the motor cylinder M. According as the slide valve $f$ or $g$ is operated, the machine will run forward or reversed.

According to Fig. 2 an auxiliary member $p$ is arranged in the conduit $d$ between the compressed air vessel on the one hand and the slide valves and the starting valve on the other hand. This auxiliary member consists of a cut-off valve formed as a cone valve, and is intended to prevent loss of compressed air and thus to insure certain and speedy operation of the several parts. The cut-off valve $p$ consists mainly of the chamber valve $q$ held in closed position by a spring $b$. A conduit $r$ leads from the casing of the cut-off valve $p$ to the operating members $k$ and $l$. These operating members $k$ and $l$ do not, however, as in Fig. 1, consist of a slide valve, but each operating member includes a valve $s$ and $t$. In this case the engine is started as follows:— The compressed air vessel A is opened, whereby the chambers $u$ and $v$ of the valve $q$ and the valves $s$ and $t$ of the operating members $k$ and $l$ are placed under pressure: the compressed air has to pass a restricted passage $w$ connecting the chambers $u$ and $v$. The operating lever $m$ is set to one side or the other according as the engine is to run forward or reversed, thereby displacing the member $k$ or $l$, with the result that the conduit $x$ is connected with the conduit $h$ or $i$. By continuing to act upon the lever $m$ the valve $s$ or $t$ is opened and the chamber $v$ becomes momentarily exhausted because sufficient air can not pass through the restricted passage $w$. Consequently the valve $q$ opens and compressed air can flow through the main conduit $d$ to the starting valve and through the conduits $x$ and $h$ or $i$ to the slide valve $f$ or $g$. The slide valve $f$ or $g$ is pressed onto its cam $n$ or $o$ and compressed air then enters through the conduit $e$ the casing of the starting valve, exerting pressure against the piston $c$. The starting valve opens and will remain open so long as the slide valve $f$ or $g$ permits of communication between $i$ or $h$ and $e$. When the slide valve is pressed back by its cam $n$ or $o$, the conduit $e$ will be in communication with the atmosphere, the starting valve will be relieved and closed under the pressure of its spring $b$. If the engine is running forward and it is to be reversed, the starting valve is actuated in the manner indicated by the reversing block. The lever $m$ is arranged in such a manner that in addition to the reversing gear it actuates the fuel pumps and enables the supply of fuel to be cut off during reversing. The starting air first acts in opposition to the movement of the engine, acting as a brake and then causes the engine to rotate in the opposite direction.

I claim—

1. Starting and reversing mechanism for multi-cylinder internal combustion engines, comprising a compressed air vessel, two distributing valves, operating members, a reversing member adapted to alternately actuate said operating members to operate either of the said distributing valves, a starting valve, conduits connecting the said distributing valves with the said starting valve and cams adapted to engage with said distributing valves respectively.

2. Starting and reversing mechanism for multi-cylinder internal combustion engines, comprising a compressed air vessel, two distributing valves, a starting valve, a conduit between the said air vessel and the said valves, operating members, an auxiliary member inserted in the said conduit, a reversing member adapted to alternately actuate said operating members to operate either of the said distributing valves, conduits connecting the said distributing valves with the said starting valve and cams adapted to engage with the said distributing valves respectively.

3. Starting and reversing mechanism for multi-cylinder internal combustion engines, comprising a compressed air vessel, two distributing valves, a starting valve, a conduit between the said air vessel and the said valves, operating members, an auxiliary member inserted in the said conduit, a reversing member, auxiliary valves arranged to be actuated by the said reversing member subsequently to the actuation of the said operating members, the said reversing member being adapted to alternately actuate said operating members to operate either of the said distributing valves, conduits connecting the said distributing valves with the said starting valve and cams to engage with the said distributing valves respectively.

4. Starting and reversing mechanism for multi-cylinder internal combustion engines, comprising a compressed air vessel, two distributing valves, a starting valve, a conduit between the said air vessel and the said valves, operating members, an auxiliary member inserted in the said conduit between the said air vessel and the said valves, said auxiliary member being provided with two chambers and a restricted passage between said chambers, a reversing member adapted to alternately actuate said operating members, to operate either of the said distributing valves, conduits connecting the said distributing valves with the said starting valve and cams to engage with the said distributing valves respectively.

5. Starting and reversing mechanism for multi-cylinder internal combustion engines, comprising a compressed air vessel, two distributing valves, a starting valve, a conduit between the said air vessel and the said valves, operating members, an auxiliary member inserted in the said conduit and provided with two chambers and a restricted passage between said chambers, a reversing member, auxiliary valves arranged to be actuated by said reversing member subsequently to the actuation of the said operating members, the said reversing member being adapted to alternately actuate said operating members to operate either of the said distributing valves, conduits connecting the said distributing valves with the said starting valve and cams to engage with one or the other of the said distributing valves.

6. Starting and reversing mechanism for multi-cylinder internal combustion engines, comprising a compressed air vessel, two distributing valves, a starting valve, conduits between the said distributing valves and the said starting valve, operating members, a reversing member adapted to alternately actuate said operating members to operate either of the said distributing valves, a piston provided in said starting valve for increasing the opening pressure, and cams to engage with one or the other of the said distributing valves.

In testimony whereof I have signed my name to this specification in the presence of two subscribing witnesses.

HANS THEODOR BRUNS.

Witnesses:
   BERNHARD GRAETZ,
   CARL GARZ.